(12) United States Patent
Jovanovic et al.

(10) Patent No.: US 10,779,249 B2
(45) Date of Patent: Sep. 15, 2020

(54) INTER-RNC TRANSPORT CHANNEL SYNCHRONIZATION

(71) Applicant: Telefonaktiebolaget LM Ericsson (publ), Stockholm (SE)

(72) Inventors: Aleksandar Jovanovic, Solna (SE); Jakub Jablonski, Lodz (PL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 135 days.

(21) Appl. No.: 15/309,236

(22) PCT Filed: Jun. 27, 2014

(86) PCT No.: PCT/IB2014/062681
§ 371 (c)(1),
(2) Date: Nov. 7, 2016

(87) PCT Pub. No.: WO2015/198101
PCT Pub. Date: Dec. 30, 2015

(65) Prior Publication Data
US 2017/0078986 A1     Mar. 16, 2017

(51) Int. Cl.
*H04W 56/00* (2009.01)
*H04W 84/04* (2009.01)

(52) U.S. Cl.
CPC ..... *H04W 56/001* (2013.01); *H04W 56/0055* (2013.01); *H04W 84/045* (2013.01)

(58) Field of Classification Search
CPC .......... H04W 56/001; H04W 56/0045; H04W 56/0055; H04W 84/045; H04W 36/02; H04W 92/12
See application file for complete search history.

(56) References Cited

U.S. PATENT DOCUMENTS 7,397,824 B2    7/2008  Okubo
2004/0252699 A1* 12/2004  Drevon ................. H04W 92/12
                                                370/395.21
(Continued)

FOREIGN PATENT DOCUMENTS

EP    1161004 A1    12/2001
EP    1643784 A1     4/2006
(Continued)

OTHER PUBLICATIONS

Landstrom, S., et al., "Heterogeneous networks—increasing cellular capacity", Expanding mobile network capacity, Ericsson review, Jan. 1, 2011, pp. 1-6, retrieved on Nov. 3, 2016, retrieved from internet: http://www.ericsson.com/res/thecompany/docs/publications/ericsson_review/2011/heterogeneous_networks.pdf.
(Continued)

*Primary Examiner* — Yemane Mesfin
*Assistant Examiner* — Mon Cheri S Davenport
(74) *Attorney, Agent, or Firm* — Patent Portfolio Builders, PLLC

(57) ABSTRACT

According to one aspect of the present disclosure, a method is implemented by a first Radio Network Controller (RNC). The first RNC determines a communication link delay of a base station supported by the first RNC. Subsequent to the determining, a request is received from a different, second RNC to add a call leg that includes the base station as a call leg for a call supported by the second RNC. Based on the request, the first RNC transmits a response to the second RNC that indicates the determined communication link delay. According to another aspect of the present disclosure, the second RNC uses the response to perform transport channel synchronization.

22 Claims, 6 Drawing Sheets

(56) References Cited

U.S. PATENT DOCUMENTS

| | | | |
|---|---|---|---|
| 2007/0081493 A1* | 4/2007 | Rune | H04L 45/02 370/331 |
| 2007/0155388 A1* | 7/2007 | Petrovic | H04W 36/30 455/442 |
| 2009/0285188 A1 | 11/2009 | Yu et al. | |
| 2010/0002614 A1* | 1/2010 | Subrahmanya | H04W 52/244 370/311 |

FOREIGN PATENT DOCUMENTS

| | | |
|---|---|---|
| EP | 2180618 A2 | 4/2010 |
| WO | 2008088592 A1 | 7/2008 |
| WO | 2014070053 A1 | 5/2014 |

OTHER PUBLICATIONS

3rd Generation Partnership Project, "3rd Generation Partnership Project; Technical Specification Group Radio Access Network; Synchronisation in UTRAN Stage 2 (Release 10)", Technical Specification, 3GPP TS 25.402 V10.1.0, Jun. 1, 2011, pp. 1-51, 3GPP, France.

3rd Generation Partnership Project, "3rd Generation Partnership Project; Technical Specification Group Radio Access Network; UTRAN Iub/Iur interface user plane protocol for DCH data streams (Release 10)", Technical Specification, 3GPP TS 25.427 V10.1.0, Jun. 1, 2011, pp. 1-48, 3GPP, France.

3rd Generation Partnership Project, "Universal Mobile Telecommunications System (UMTS); Synchronisation in UTRAN Stage 2", Technical Specification, (3GPP TS 25.402 version 11.0.0 Release 11), ETSI TS 125 402 V11.0.0, Oct. 1, 2012, pp. 1-53, ETSI.

3rd Generation Partnership Project, "Universal Mobile Telecommunications System (UMTS); UTRAN Iur unterface Radio Network Subsystem Application Part (RNSAP) signalling", Technical Specification (3GPP TS 25.423 Version 11.7.0 Release 11), ETSI TS 125 423 V11.7.0, Jan. 1, 2014, pp. 1-1165, ETSI.

Huawei, "Enable node synchronization is supported by the user plane protocols for HS-DSCH", 3GPP TSG RAN WG3 Meeting #61, Jeju Islands, Korea, Aug. 18, 2008, pp. 1-6, R3-081916, 3GPP, France.

\* cited by examiner

INTER-RNC TRANSPORT CHANNEL SYNCHRONIZATION

TECHNICAL FIELD

The present disclosure relates to synchronization, and more particularly to determining communication link delays, and using such delays in performing transport channel synchronization.

BACKGROUND

Wireless communication networks have traditionally relied upon macro base stations to support relatively large macro cells. However, in order to increase capacity in wireless communication networks, smaller non-macro base stations are being deployed that support "small cells" such as pico cells, femto cells, etc. These small cells are deployed in addition to existing macro cells to increase network capacity and coverage. In some instances, a single Radio Network Controller (RNC) may support a large number of non-macro base stations throughout a wireless communication network (i.e., include those base stations in its Radio Network Subsystem "RNS"). The term RNS refers to one or more RNCs and the base stations that are supported by the one or more RNCs. A RNS is responsible for the resources and for transmission and reception in a set of cells.

According to 3GPP standards (e.g., ETSI TS 125.427 and TS 125.402), a serving RNC (SRNC) performs initial transport channel synchronization when adding a new radio link for a call, as part of the dedicated radio link setup procedure. Because handover in which a given link is added may be performed quite frequently, such transport channel synchronization may be frequently needed. Without performance of such synchronization, it is possible that packets will be dropped due to arriving at their destination outside of an acceptable reception window. Transport channel synchronization is performed by a given RNC between the RNC and all base stations in the so-called "active set" (i.e., all base stations that a given wireless terminal is simultaneously connected to). In some instances, when adding a new radio link at soft handover, an existing transport channel synchronization, which uses an old timing, can still be used. This is more likely to be true in a network that has small transport delays. However, when adding a radio link that exhibits a larger transport delay, transport channel synchronization may need to be reinitialized.

In Universal Mobile Telecommunications System (UMTS) networks, if a new radio link includes a base station supported by a different RNC, such as a drift RNC (DRNC), the SRNC performs transport channel synchronization by sending a synchronization control frame to the base station of the new leg, receiving a response from the base station, and calculating the round trip time (RTT) between the SRNC and the base station of the new leg.

The interface between a RNC and a base station is known as the "Iub" interface, whereas the interface between two RNCs is known as the "Iur" interface. Handovers between cells with different delays belonging to different RNCs are quite common. Delays on the Iur interface are usually rather short as they typically include a good quality transport connection (e.g., a carrier grade connection). Delays on Iub interfaces, however, can vary considerably because the quality of transport solutions connecting a given base station to its corresponding RNC can vary. A given Iub interface may include a fiber optic, asymmetric digital subscriber line (ADSL), or very-high-bit-rate digital subscriber line (VDSL) connection, for example, and these exhibit varying amounts of delay. Moreover, when a given RNC supports a large number of small cells, those Iub interface can vary to an even greater degree, because it is more likely that a non-carrier grade link will be used for the Iub interface of a small cell. In view of this, the RTT time calculations performed in connection with transport channel synchronization can cause considerable delays when adding call legs.

SUMMARY

According to one aspect of the present disclosure, a method is implemented by a first Radio Network Controller (RNC) (e.g., a DRNC), in which the RNC determines a communication link delay of a base station supported by the first RNC. Subsequent to the determining, a request is received from a different, second RNC (e.g., a SRNC) to add a call leg that includes the base station for a call supported by the second RNC. Based on the request, a response is transmitted to the second RNC that indicates the determined communication link delay.

In one or more embodiments, the communication link delay is an Iub interface delay. In one or more embodiments, the request is a Radio Network Subsystem Application Part (RNSAP) request, and the response is a RNSAP response.

According to another aspect of the present disclosure, a request is transmitted from a first RNC (e.g., a SRNC) to a different, second RNC (e.g., a DRNC) to add a call leg that includes a base station supported by the second RNC for a call of a wireless terminal supported by the first RNC. The first RNC receives a response from the second RNC that indicates a predetermined communication link delay for the base station. The first RNC performs transport channel synchronization for the wireless terminal based on a set of communication link delays that includes the predetermined communication link delay. The predetermined communication link delay is predetermined prior to the transmitting.

In one or more embodiments, the communication link delay is an Iub interface delay. In one or more embodiments, the request is a RNSAP request, and the response is a RNSAP response.

In one or more embodiments, to perform transport channel synchronization, the first RNC determines a maximum of the communication link delays in the set, and performs one or both of: adjusting a connection frame number (CFN) of the first RNC based on the maximum delay, and adjusting a transmission time of a data frame that is transmitted from the first RNC based on the maximum delay.

According to another aspect of the present disclosure, a first RNC (e.g., a DRNC) includes a memory circuit and one or more processing circuits. The one or more processing circuits are configured to determine a communication link delay of a base station supported by the first RNC, and store the determined communication link delay in the memory circuit. The one or more processing circuits are further configured to, subsequent to the determination of the communication link delay, receive a request from a different, second RNC (e.g., a SRNC) to add a call leg that includes the base station for a call supported by the second RNC. Based on the request, the one or more processing circuits are configured to transmit a response to the second RNC that indicates the determined communication link delay.

In one or more embodiments, the communication link delay is an Iub interface delay. In one or more embodiments, the request is a RNSAP request, and the response is a RNSAP response.

According to another aspect of the present disclosure, a first RNC (e.g., a SRNC) includes a memory circuit configured to store communication link delays, and one or more processing circuits. The one or more processing circuits are configured to transmit a request from the first RNC to a different, second RNC (e.g., a DNRC) to add a call leg that includes a base station supported by the second RNC for a call of a wireless terminal supported by the first RNC. The one or more processing circuits are further configured to receive a response from the second RNC that indicates a predetermined communication link delay for the base station, and perform transport channel synchronization for the wireless terminal based on a set of communication link delays that includes the predetermined communication link delay. The predetermined communication link delay is predetermined prior to the transmission of the request.

In one or more embodiments, the communication link delay is an Iub interface delay. In one or more embodiments, the request is a RNSAP request, and the response is a RNSAP response.

In one or more embodiments, to perform transport channel synchronization, the one or more processing circuits are configured to determine a maximum of the communication link delays in the set, and perform one or both of: adjusting a CFN of the first RNC based on the maximum delay, and adjusting a transmission time of a data frame that is transmitted from the first RNC based on the maximum delay.

According to another aspect of the present disclosure, a method is implemented by a first RNC (e.g., a DRNC). The first RNC determines a communication link delay for each of a first base station and a second base station supported by the first RNC. The first base station is included in a first call leg of a call supported by a different, second RNC (e.g., a SRNC), and the second base station is included in a second leg of the call. Subsequent to the determining, the first RNC receives a request from the second RNC to delete the first call leg. Based on the request, the first RNC transmits a response to the second RNC that indicates the determined communication link delay for the second base station which is still part of the call.

In one or more embodiments, each communication link delay is an Iub interface delay. In one or more embodiments, the request is a RNSAP request, and the response is a RNSAP response.

According to another aspect of the present disclosure, a method is implemented by a first RNC (e.g., a SRNC). The first RNC establishes a call for a wireless terminal supported by the first RNC. The call includes first and second call legs supported by a different, second RNC (e.g., a DRNC). The first call leg includes a first base station supported by the second RNC, and the second call leg includes a second base station supported by the second RNC. The first RNC transmits a request to the second RNC to delete the first call leg. The first RNC receives a response from the second RNC that indicates a predetermined communication link delay for the second base station. The first RNC performs transport channel synchronization for the wireless terminal based on a set of communication link delays that includes the predetermined communication link delay for the second base station. The predetermined communication link delay is predetermined prior to the transmitting.

In one or more embodiments, each communication link delay is an Iub interface delay. In one or more embodiments, the request is a RNSAP request, and the response is a RNSAP response.

In one or more embodiments, to perform transport channel synchronization, the first RNC determines a maximum of the communication link delays in the set, and performs one or both of: adjusting a connection frame number (CFN) of the first RNC based on the maximum delay, and adjusting a transmission time of a data frame that is transmitted from the first RNC based on the maximum delay.

According to another aspect of the present disclosure, a first RNC (e.g., a DRNC) includes a memory circuit and one or more processing circuits. The one or more processing circuits are configured to determine a communication link delay for each of a first base station and a second base station supported by the first RNC, and store the determined communication link delay in the memory circuit. The first base station is included in a first call leg of a call supported by a different second RNC, and the second base station is included in a second leg of the call. The one or more processing circuits are further configured to, subsequent to the determination of the communication link delays, receive a request from the second RNC to delete the first call leg; and based on the request, transmit a response to the second RNC that indicates the determined communication link delay for the second base station which is still part of the call.

In one or more embodiments, each communication link delay is an Iub interface delay. In one or more embodiments, the request is a RNSAP request, and the response is a RNSAP response.

According to another aspect of the first closure, a first RNC (e.g., a SRNC) includes a memory circuit configured to store communication link delays, and one or more processing circuits. The one or more processing circuits are configured to establish a call for a wireless terminal supported by the first RNC. The call includes first and second call legs supported by a different, second RNC. The first call leg includes a first base station supported by the second RNC, and the second call leg includes a second base station supported by the second RNC. The one or more processing circuits are further configured to transmit a request to the second RNC to delete the first call leg, and receive a response from the second RNC that indicates a predetermined communication link delay for the second base station. The one or more processing circuits are further configured to perform transport channel synchronization for the wireless terminal based on a set of communication link delays that includes the predetermined communication link delay for the second base station. The predetermined communication link delay is predetermined prior to the transmission of the request.

In one or more embodiments, each communication link delay is an Iub interface delay. In one or more embodiments, the request is a RNSAP request, and the response is a RNSAP response.

In one or more embodiments, to perform transport channel synchronization, the first RNC determines a maximum of the communication link delays in the set, and performs one or both of: adjusting a connection frame number (CFN) of the first RNC based on the maximum delay, and adjusting a transmission time of a data frame that is transmitted from the first RNC based on the maximum delay.

Of course, the present disclosure is not limited to the above features and advantages. Indeed, those skilled in the art will recognize additional features and advantages upon reading the following detailed description, and upon viewing the accompanying drawings.

DETAILED DESCRIPTION

The present disclosure describes techniques for performing or supporting the performance of transport channel synchronization in networks with varying transport characteristics. Each RNC measures the transmission delays to the respective base stations in its own Radio Network Subsystem (RNS) in the background, without prompting from another RNC or base station (e.g., without receiving a synchronization control frame prompting such a determination). A given RNC (e.g., a DRNC), may be asked for the communication link delay between itself and a base station that is to be added to the active set for a wireless terminal supported by another RNC (e.g., a SRNC). Upon receiving such a request, the DRNC sends, to the SRNC, the predetermined delay value for one of its base stations that is identified in the request. The SRNC can use the predetermined delay value when performing transport channel synchronization (e.g., on a dedicated transport channel "DCH") at the establishment of a new radio link. In one or more embodiments, predetermined delay values are shared using Radio Network Subsystem Application Part (RNSAP) signaling over the Iur interface between the RNCs. By using predetermined communication link delays, call set up times can be considerably improved.

The techniques discussed herein decrease call setup times and soft handover times, as transport delays do not need to be measured at radio link establishment. Instead, they are measured in the background prior to performance of radio link establishment. The predetermined communication link delay can be sent to the SRNC using a "Radio Link Addition Response" or "Radio Link Setup Response," for example. The response may be sent in response to a "Radio Link Addition Request" or "Radio Link Setup Request." A "Radio Link Addition Request" and "Radio Link Addition Response" are used when there is already one or more existing radio links in a DRNC for a given call. In contrast, a "Radio Link Setup Request" and "Radio Link Setup Response" are used when there is not already one or more existing radio links in the DRNC for a given call. As used herein, a "call" can refer to a voice call and/or a data call, and is not limited to just voice calls. Also, "adding a call leg" can refer to either a "Radio Link Addition" or "Radio Link Setup."

Figure 1:
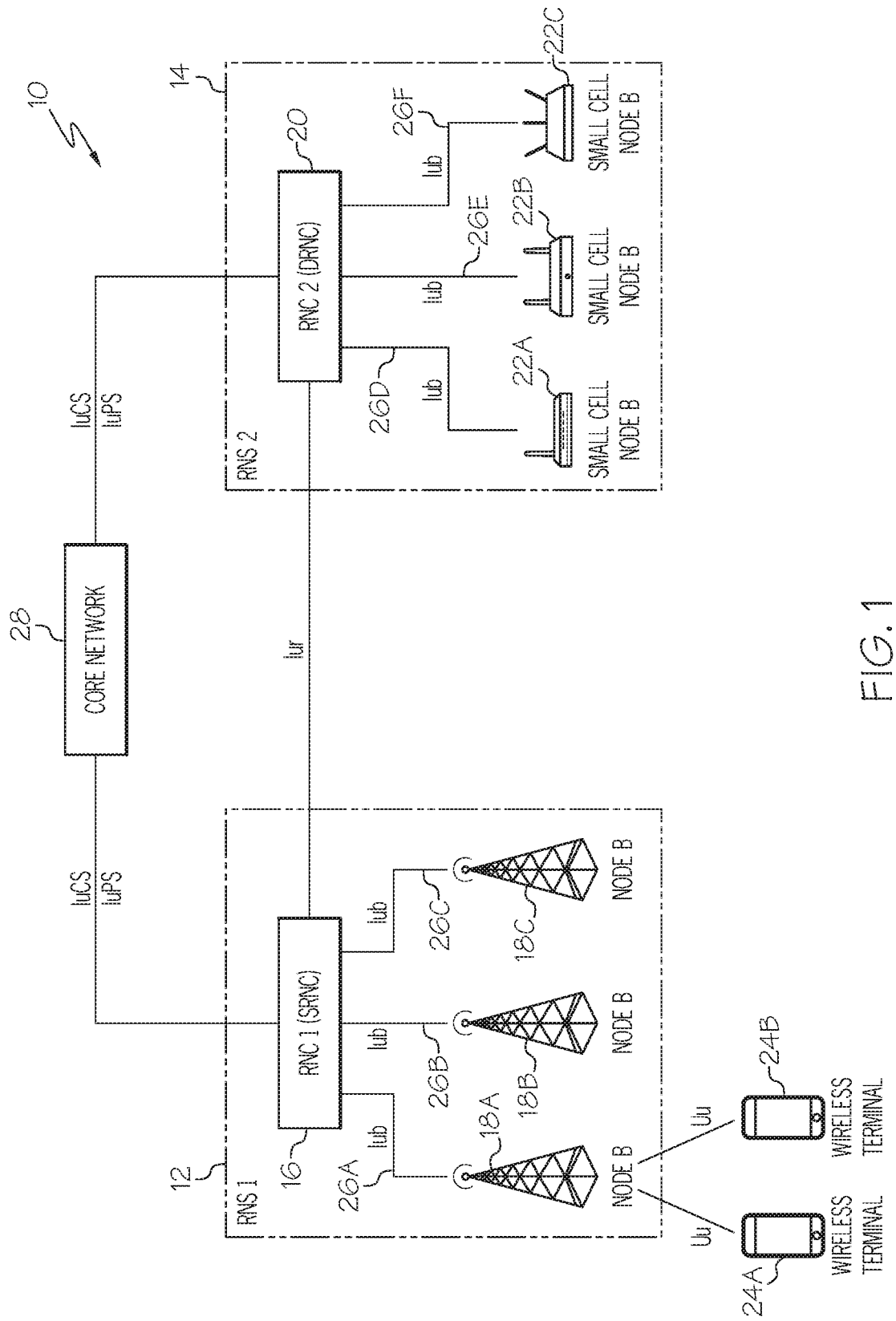
FIG. 1 illustrates an example wireless communication network that includes multiple Radio Network Subsystems (RNSs).

With this in mind, FIG. 1 illustrates an example UMTS network 10 which includes a first RNS 12, and a second RNS 14. As discussed above, a RNS is responsible for the resources and for transmission and reception in a set of cells. The first RNS 12 includes RNC 16 and base stations 18A-C, while the second RNS 14 includes RNC 20 and base stations 22A-C. A base station is known as a "NodeB" in UMTS terminology. For the discussion below, assume that RNC 16 acts as a SRNC, and that RNC 20 acts as a DNRC with respect to wireless terminals 24A-B. Each base station 18, 22 communicates with its respective RNC 16, 20 over a respective Iub interface 26. Thus, the Iub interface 26 serves as a communication link between a given RNC and a base station supported by the RNC. The interface between each RNC 16, 22 is known as the Iur interface. Each RNC communicates with a core network 28 portion of the wireless communication network 10 using an IuCS and/or an IuPS interface.

As shown in FIG. 1, wireless terminals 24A-B communicate with each other via a single base station 18A, so the only Iub interface that is implicated is Iub interface 26A. However, if wireless terminal 24B is handed over to base station 22A in a soft handover (such that RNC 16 acts as SRNC and RNC 20 acts as DRNC), then the delay of Iub interface 26D must also be considered. In the prior art, determination of the delay of a DRNC Iub interface would have involved sending a synchronization control frame to the base station of the new leg, receiving a response from that base station, and calculating the round trip time (RTT) of between the SRNC and the base station of the new leg. Also, this would have been performed during establishment of the new call leg that includes base station. The methods and apparatus discussed herein present improvements over this prior art technique.

The term "wireless terminal" is used herein to refer generally to a device that attaches to a wireless communication network, and can include a User Equipment (UE) as that term is used by the 3rd Generation Partnership Project (3GPP). A wireless terminal can include a standalone wireless device (e.g., a cellphones and/or wireless-equipped personal digital assistant), as well as a wireless card designed for attachment to or insertion into another electronic device, such as a personal computer. Also, although the base stations 22A-C are illustrated as small cell base stations, it is understood that this is only an example, and that the techniques discussed herein could still be applied even if all cells were macro cells supported by macro base stations.

Figure 2:
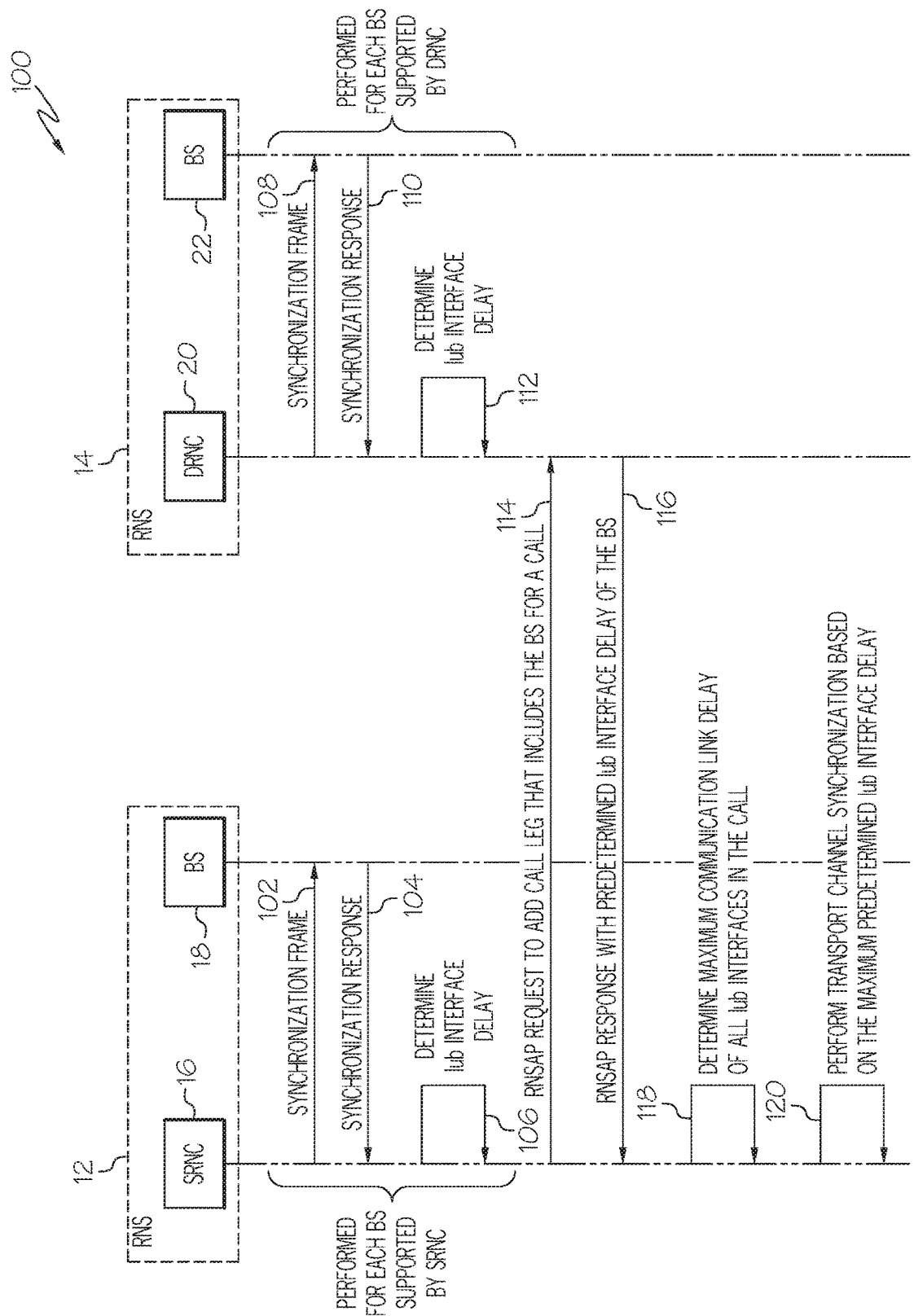
FIG. 2 is a signaling diagram illustrating a procedure for performing transport channel synchronization in a wireless communication network.

FIG. 2 is a signaling diagram illustrating a procedure 100 for performing transport channel synchronization in a wireless communication network. SRNC 16 sends a synchronization frame to its supported base station 18 (102), and the base station 18 correspondingly sends a synchronization response (104). Based on the synchronization response, the SRNC 16 determines an Iub interface delay of the base station 18. This may be performed, for example, according to § 5.3 or § 5.5 of 3GPP TS 25.427. In some embodiments, items 102-106 are performed for each base station 18 supported by the SRNC 16 (e.g., base stations 18A-C in FIG. 1). Also, items 102-106 are performed as background processing, before the Iub interface delays are needed to perform transport channel synchronization. As such, when the Iub interface delay is needed, it is already predetermined and readily available. Thus, the delays may be predetermined autonomously, without request by a companion RNC (e.g., a SRNC).

Likewise, the DRNC 20 sends a synchronization frame to its supported base station 22 (108), and the base station 22 correspondingly sends a synchronization response (110). Based on the synchronization response, the DRNC 20 determines an Iub interface delay of the base station 22. This may be performed, for example, according to § 5.3 or § 5.5 of 3GPP TS 25.427. Notably though, items 108-112 are performed for each base station 22 supported by the SRNC 16

(e.g., base stations 22A-C in FIG. 1). In some embodiments, items 108-112 are performed as background processing, before the Iub interface delays are actually needed for transport channel synchronization. As such, when the Iub interface delay is needed, it is already predetermined and readily available. Items 102-106 and 108-112 may be performed concurrently, or may be performed in different orders such that 102-106 may precede or follow 108-112.

Subsequent to the determination of the Iub interface delays, the SRNC 16 transmits a Radio Network Subsystem Application Part (RNSAP) request to the DRNC 20 over the Iur interface between the RNCs 16, 20 requesting that a call leg be added that includes a base station 22 supported by the DRNC 20 for a call supported by the SRNC 16 (114). Based on the request, the DRNC 20 provides a RNSAP response over the Iur interface that includes a predetermined Iub interface delay of the base station 22 indicated in the request of 114 (116). The SRNC 16 determines a maximum communication link delay of a set of Iub interface delays of all Iub interfaces implicated in the call (118), and then performs transport channel synchronization based on the maximum predetermined Iub interface delay in the set (120). Thus, in some embodiments the "set" of communication link delays may be the "active set" for a given wireless terminal (e.g., each base station that the wireless terminal is connected to or is going to be connected to).

In some embodiments, the performance of transport channel synchronization includes adjusting a connection frame number (CFN) of the SRNC 16 based on the maximum delay and/or adjusting a transmission time of a data frame that is transmitted from the first RNC based on the maximum delay. The CFN serves a counter for transport channel synchronization. This may be performed as taught in WO 2014/070053, for example. As discussed in the '053 application, in some examples, a transmission time of a data frame may be adjusted if the delay at issue does not exceed a Transmission Time Interval (TTI), while the CFN adjustment may be performed if the delay does exceed a TTI.

In one or more embodiments, a technique such as a "sliding window average" may be used by a given RNC to achieve a better estimate of the predetermined communication link delays in its RNS. This may be useful in networks with large delay variation, for example. In such embodiments, the sliding window average determination may exclude the largest delays.

In some embodiments, when the SRNC is performing the determination of 118, the SRNC may add an Iur delay to all predetermined Iub interface delays received from the DRNC. The Iur delay is assumed to be constant and is configured per Iur link. The Iur interface is typically carried on a good quality transport link, over which delay variation is assumed to be minimal. The Iur delay may be a hard coded value or operator parameter, for example, and thus may be configured by a given network operator. Alternatively, the Iur delay may be measured between two RNCs 16, 20 instead of being hard coded.

Figure 3:
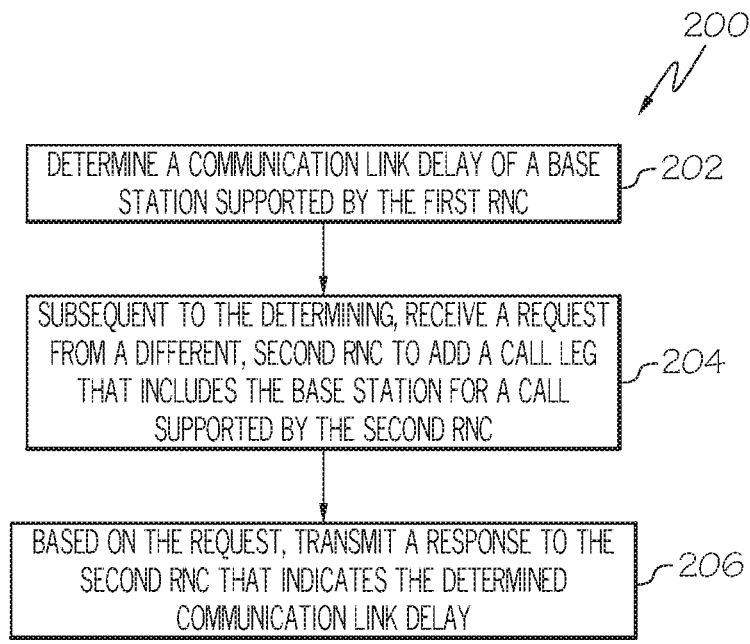
FIG. 3 is a flowchart for an example method implemented by a RNC.
Figure 4:
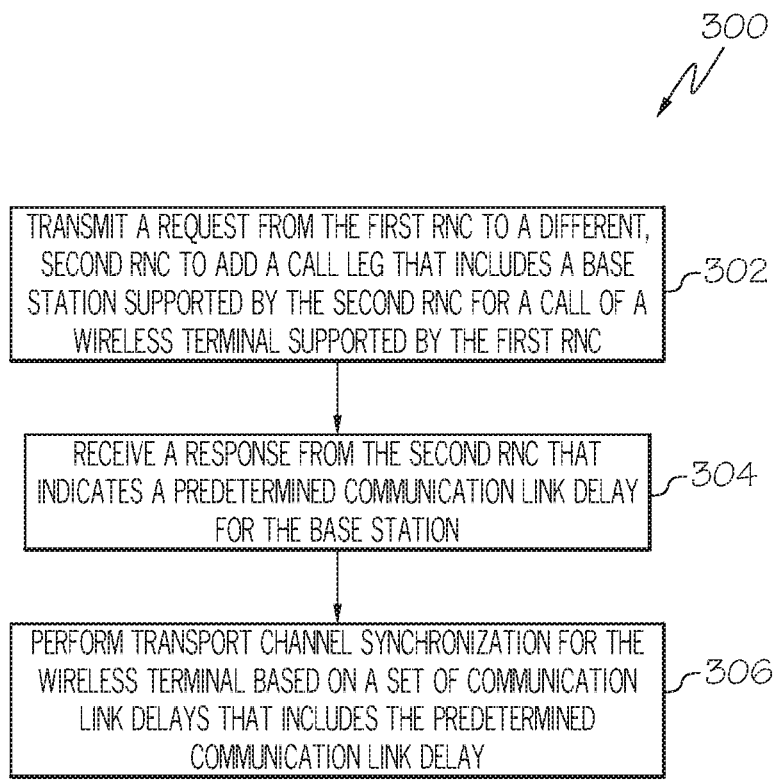
FIG. 4 is a flowchart for another example method implemented by a RNC.

FIGS. 3-4 are flowcharts of example methods 200, 300 performed by RNCs. The procedure 100 of FIG. 2 is one example of an embodiment of each of the methods 200, 300. Referring first to FIG. 3, the method 200 is implemented by a first RNC (e.g., a DRNC). According to the method 200, the first RNC determines a communication link delay of a base station supported by the first RNC (e.g., base station 22A) (block 202). Subsequent to the determining, the first RNC receives a request from a different, second RNC (e.g., a SRNC) to add a call leg that includes the base station for a call supported by the second RNC (block 204). Based on the request, the first RNC transmits a response to the second RNC that indicates the determined communication link delay (block 204).

In one or more embodiments of the method 200, the determining of block 202 is performed to determine a communication link delay for each of a plurality of base stations supported by the first RNC (e.g., each of base stations 22A-C). In such embodiments, the response includes the determined communication link delay for each base station that is supported by the first RNC and that is identified in the request, and excludes the determined communication link delay for each base station that is supported by the first RNC but is not identified in the request. Thus, using the example of DRNC 20 of FIG. 1, the Iub interface delay of Iub interfaces 26D-F may be measured, but the communication link delays of Iub interfaces 26E-F would be excluded if their corresponding base stations 22B, 22C were not identified in the request of block 204.

In some embodiments, the request (block 204) and response (block 206) are transmitted over the Iur interface between the first and second RNCs, and each communication link delay is an Iub interface delay. In some embodiments, the request is a Radio Network Subsystem Application Part (RNSAP) request, and the response is a RNSAP response. As shown in FIG. 1, one or more of the plurality of base stations may be non-macro base stations 22 that support small cells. Also, in some embodiments the first RNC acts as a DRNC with respect to a soft handover from the second RNC (which in turn may act as a SRNC).

Referring now to FIG. 4, a method 300 implemented by a RNC (e.g., a SRNC) is shown. The first RNC transmits a request from the first RNC to a different, second RNC (e.g., a DRNC) to add a call leg that includes a base station supported by the second RNC for a call of a wireless terminal supported by the first RNC (block 302). The first RNC receives a response from the second RNC that indicates a predetermined communication link delay for the base station (block 304). The first RNC performs transport channel synchronization for the wireless terminal based on a set of communication link delays that includes the predetermined communication link delay (block 306). The predetermined communication link delay is predetermined prior to the transmitting of block 302.

In some embodiments, the method 300 also includes determining one or more additional communication link delays that each correspond to a communication link of a respective base station supported by the first RNC that is part of a call leg for the call (e.g., a call leg that is already established or that is to be established for the call over one of the Iub interfaces 26A-C). In such embodiments, this determining is performed prior to the transmitting of block 302, and the one or more additional communication link delays are included in the set of communication link delays.

In some embodiments, the performance of transport channel synchronization in block 206 includes determining a maximum of the communication link delays in the set; and performing one or both of: adjusting a CFN of the first RNC based on the maximum delay, and adjusting a transmission time of a data frame that is transmitted from the first RNC based on the maximum delay. As discussed above, whether the CFN is adjusted or the transmission time is adjusted may be based on whether the maximum transmission delay is greater than or less than a single TTI.

In some embodiments, the request of block 302 and the response of block 304 are transmitted over an Iur interface between the first and second RNCs, and each communication link delay is an Iub interface delay. In some embodiments, the request of block 302 is a RNSAP request, and the response of block 304 is a RNSAP response.

In some embodiments, the method 300 also includes adding a predefined Iur interface delay of the Iur interface between the first and second RNCs to the communication link delay for the base station supported by the second RNC to determine a modified communication link delay for the base station supported by the second RNC. In such embodiments, the determining a maximum of the communication link delays is performed based on the modified communication link delay.

Figure 5:
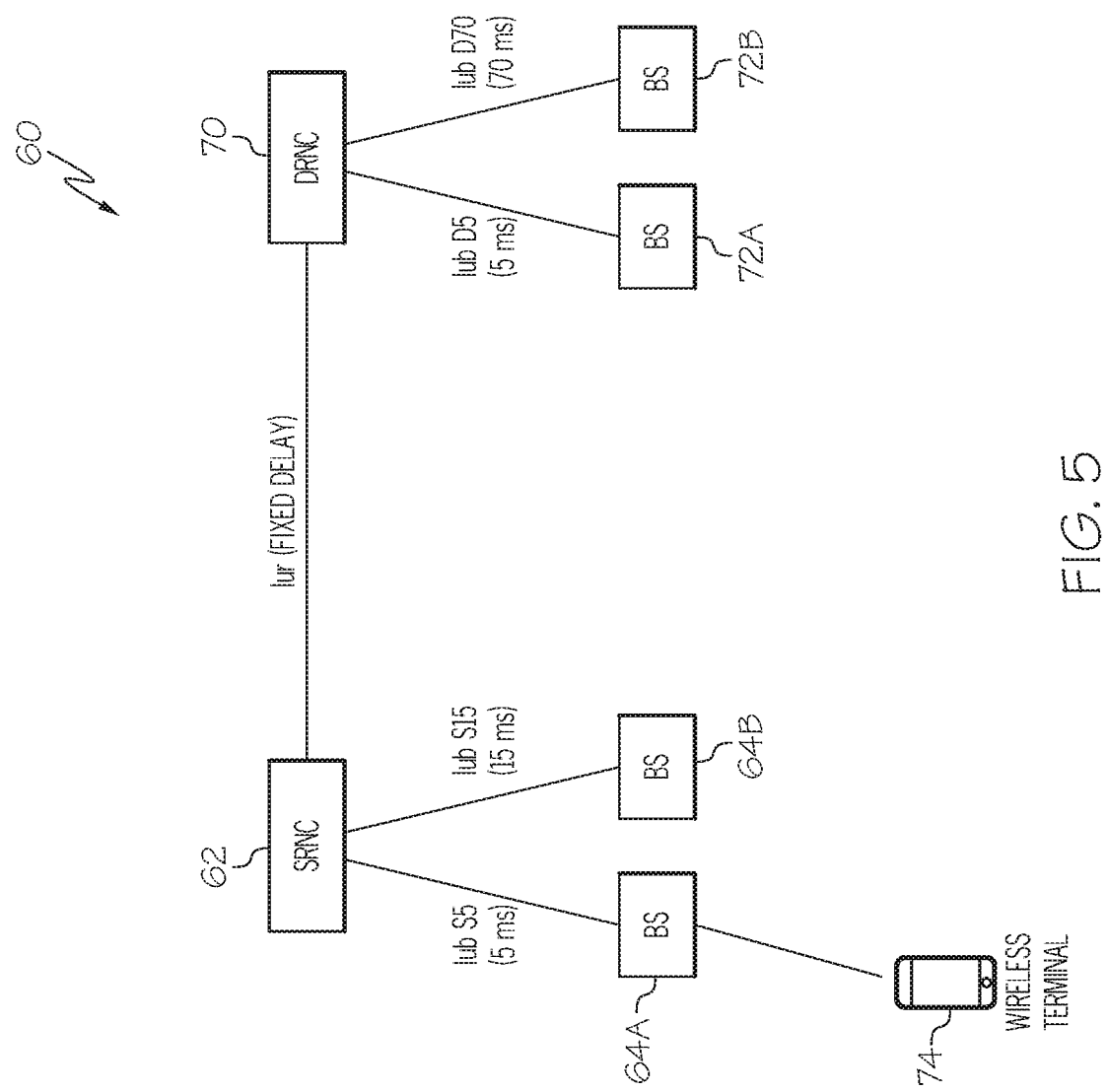
FIG. 5 illustrates a number of example communication delays in a wireless communication network.

Some example implementations of the methods 200, 300 will now be discussed in connection with FIG. 5. FIG. 5 illustrates a wireless communication network 60 that includes a SRNC 62 that supports base stations 64A and 64B, and a DRNC 70 that supports base stations 72A and 72B. A wireless terminal 74 is supported by base station 64A and SRNC 62. The base stations 64, 72 have a variety of different Iub interface delays. Base station 64A has an Iub interface delay of 5 ms (labeled "S5"). Base station 64B has an Iub interface delay of 15 ms (labeled "S15"). Base station 72A has an Iub interface delay of 5 ms (labeled "D5"). Base station 72B has an Iub interface delay of 70 ms (labeled D70). For the discussion below assume that a delay value will be represented with the variable epsilon ($\varepsilon$). Also, assume that the fixed Iur delay is 2 ms.

Assume in a first scenario that a call has legs on Iub S5 and Iub S15, and that the SRNC 62 requests to create a new call leg on Iub D5 with a RNSAP "Radio Link Setup Request" message. In this example, the set of communication link delays would include {S5, S15, D5}. The DRNC 70 would respond to the RNSAP request with a RNSAP response that includes a predetermined delay value $\varepsilon$=5 ms for Iub interface D5. Based on this, SRNC 62 would calculate a maximum delay using equation (1) below.

$$\varepsilon_{max}=\max(S5,S15,D5+Iur\ delay) \quad \text{equation (1)}$$

Assuming a fixed Iur delay of 2 ms, $\varepsilon_{max}$ would equal 15 ms. The SRNC 62 would then perform transport channel synchronization based on the determined $\varepsilon_{max}$ value.

Assume in a second scenario that a call has legs on Iub S5 and Iub S15, and that the SRNC 62 requests to create a new call leg on Iub D70 with a RNSAP "Radio Link Setup Request" message. In this example, the set of communication link delays would include {S5, S15, D70}. The DRNC 70 would respond to the RNSAP request with a RNSAP response that includes a predetermined delay value $\varepsilon$=70 ms for Iub interface D70. Based on this, SRNC 62 would calculate a maximum delay using equation (2) below.

$$\varepsilon_{max}=\max(S5,S15,D70+Iur\ delay) \quad \text{equation (2)}$$

Assuming a fixed Iur delay of 2 ms, $\varepsilon_{max}$ would equal 72 ms. The SRNC 62 would then perform transport channel synchronization based on the determined $\varepsilon_{max}$ value.

Assume in a third scenario that a call has legs on Iub S5 and Iub D5, and that the SRNC 62 requests to create a new call leg on Iub D70 with a RNSAP "Radio Link Addition Request" message. As discussed above, a "Radio Link Addition Request" is used when there is already one or more existing radio links in a DRNC for a given call (whereas a "Radio Link Setup Request" is used when there is not already an existing radio link in the DRNC for a given call). In this example, the set of communication link delays would include {S5, D5, D70}. The DRNC 70 would respond to the RNSAP request with a RNSAP response that includes a predetermined delay value $\varepsilon$=70 ms for Iub interface D70. Optionally, the delay value for D5 could also be reported (even though a recent value for it would already be known by the SRNC 62). Based on this, SRNC 62 would calculate a maximum delay using equation (3) below.

$$\varepsilon_{max}=\max(S5,D5+Iur\ delay,D70+Iur\ delay) \quad \text{equation (3)}$$

Assuming a fixed Iur delay of 2 ms, $\varepsilon_{max}$ would equal 72 ms. The SRNC 62 would then perform transport channel synchronization based on the determined $\varepsilon_{max}$ value.

Assume in a fourth scenario that a call has legs on Iub S5, Iub D5, and Iub D70, and that the SRNC 62 requests to delete the call leg on Iub D70 with a RNSAP "Radio Link Deletion Request" message. In this example, the set of communication link delays would include {S5, D5, D70}. The DRNC 70 would respond to the RNSAP request with a RNSAP response. Optionally, the response could include the delay value for D5 (even though a recent value for it would already be known by the SRNC 62). Based on this, SRNC 62 would calculate a maximum delay using equation (4) below.

$$\varepsilon_{max}=\max(S5,D5+Iur\ delay) \quad \text{equation (4)}$$

Assuming a fixed Iur delay of 2 ms, $\varepsilon_{max}$ would equal 7 ms. The SRNC 62 would then perform transport channel synchronization based on the determined $\varepsilon_{max}$ value.

Assume in a fifth scenario that base station 72A supports multiple cells: "cell A" (having Iub interface delay D5a of 5 ms) and "cell B" (having Iub interface delay D5b of 5 ms). Assume also that a call has legs on Iub S5, and Iub D5a. The SRNC 62 requests to create a new call leg in cell B (which implicates Iub interface D5b) with a RNSAP "Radio Link Addition Request" message. In this example, the set of communication link delays would include {S5, D5a, D5b}. The DRNC 70 would respond to the RNSAP request with a RNSAP response, which would include the delay for D5b. Optionally, the response could include the delay value for D5a (even though a recent value for it would already be known by the SRNC 62). Based on this, SRNC 62 would calculate a maximum delay using equation (4) below.

$$\varepsilon_{max}=\max(S5,D5a+Iur\ delay,D5b+Iur\ delay) \quad \text{equation (4)}$$

Assuming a fixed Iur delay of 2 ms, $\varepsilon_{max}$ would equal 7 ms. The SRNC 62 would then perform transport channel synchronization based on the determined $\varepsilon_{max}$ value.

In some embodiments, the maximum delay $\varepsilon$ value reported by DRNC for the same Iub link can vary in time because the delay on the Iub link is subject to variation. Referring to the fifth scenario above, the delay of the D5 interface could have a first value D5a when cell A was added to the call, and subsequently could have a different value D5b when cell B is added. In case of long-term variation, subsequent reports could change slowly. However, in case of a route change (i.e., when a router decides to route packets in a different way than they were previously routed), subsequent reports can be very different. Thus, there are occasions when it may be important to re-report the delay for a given Iub interface.

In some embodiments, the predetermined radio link is reported using a custom information element (IE) named "Epsilon" ($\varepsilon$). Of course, this is only an example, and it is understood that a different custom IE name could be used (or that a non-custom IE could be used). In one or more embodiments, the custom IE is added as extension to "Radio Link Setup Response" and "Radio Link Addition Response" messages specified in 3GPP TS 25.423 § 9.1.4.1 and § 9.1.7.1 (e.g., as part of "RadioLinkSetupResponseFDD-Extensions" and "RadioLinkAdditionResponseFDD-Extensions").

As discussed in the fourth scenario above, a predetermined communication link delay may be returned by the DRNC based on receipt of a "Radio Link Deletion Request." This scenario will now be discussed in connection with FIGS. 6-7.

Figure 6:
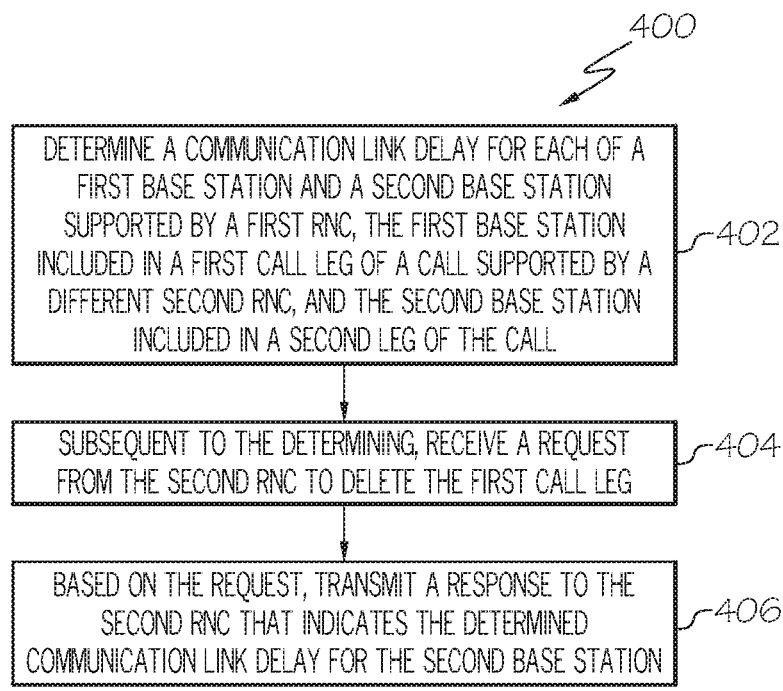
FIG. 6 is a flowchart for another example method implemented by a RNC.

FIG. 6 is a flowchart for an example method 400 implemented by a first RNC (e.g., DRNC 70). The first RNC determines a communication link delay for each of a first base station and a second base station supported by the first RNC (block 402). These communication link delays could include delays D5 and D70 in the fourth scenario above, for example. The first base station (e.g., base station 72B) is included in a first call leg of a call supported by a different, second RNC (e.g., SRNC 62), and the second base station (e.g., base station 72A) is included in a second leg of the call. Subsequent to the determining of block 402, the first RNC receives a request from the second RNC to delete the first call leg (block 404). Based on the request, the first RNC transmits a response to the second RNC that indicates the determined communication link delay for the second base station (block 406) which is still part of the call. This could include, for example, the delay D5 in the fourth scenario above.

In some embodiments, the request of block 404 and the response of block 406 are transmitted over an Iur interface between the first and second RNCs, and each communication link delay is an Iub interface delay. In some embodiments, the request of block 404 is a RNSAP request, and the response of block 406 is a RNSAP response.

In one or more embodiments of the method 400, if three or more call legs of the call are supported by the first RNC (e.g., the DRNC 70), the indicated call leg is deleted, the DRNC determines which of its remaining call legs has the greatest communication link delay, and the DRNC returns that greatest communication link delay value to the second RNC in block 406.

Figure 7:
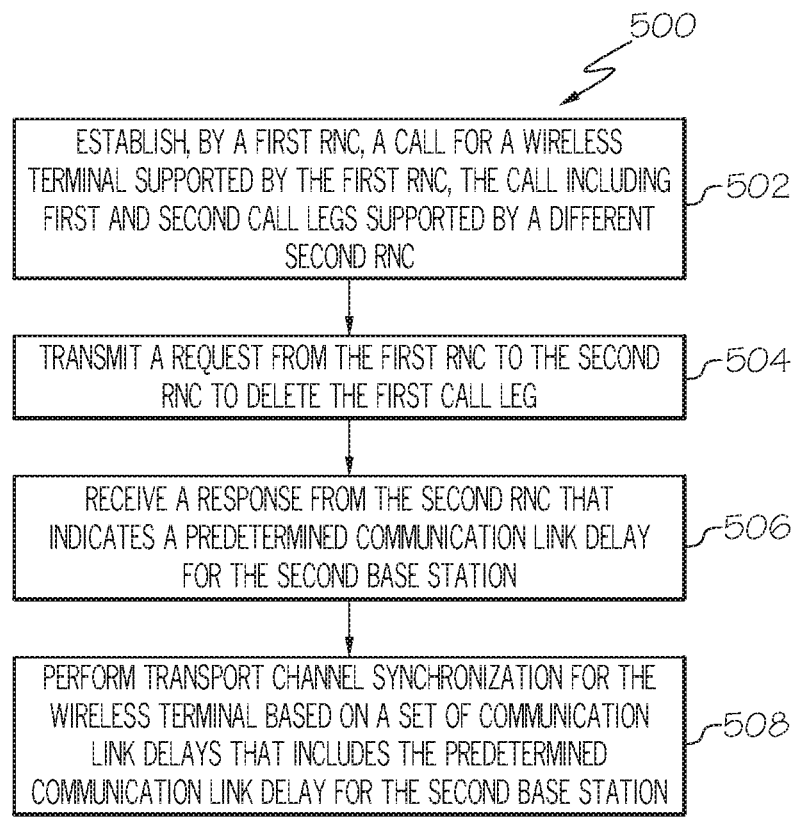
FIG. 7 is a flowchart for another example method implemented by a RNC.

FIG. 7 is a flowchart for another example method 500 implemented by a first RNC (e.g., SRNC 62). The first RNC establishes a call for a wireless terminal supported by the first RNC (e.g., wireless terminal 74) (block 502). The call includes first and second call legs supported by a different, second RNC (e.g., DRNC 70). The first call leg includes a first base station supported by the second RNC (e.g., base station 72B), and the second call leg includes a second base station supported by the second RNC (e.g., base station 72A). The first RNC transmits a request to the second RNC to delete the first call leg (block 504). The first RNC receives a response from the second RNC that indicates a predetermined communication link delay for the second base station (block 506). This could include the delay D5 in the fourth scenario above, for example. The first RNC performs transport channel synchronization for the wireless terminal based on a set of communication link delays that includes the predetermined communication link delay for the second base station (block 508). The predetermined communication link delay is predetermined prior to the transmitting of block 504.

In some embodiments, the request of block 504 and the response of block 506 are transmitted over an Iur interface between the first and second RNCs, and each communication link delay is an Iub interface delay. In some embodiments, the request of block 504 is a RNSAP request, and the response of block 506 is a RNSAP response.

As in the examples discussed above, the performance of transport channel synchronization (block 508) could include determining a maximum of the communication link delays in the set; and performing one or both of: adjusting a CFN of the first RNC based on the maximum delay, and adjusting a transmission time of a data frame that is transmitted from the first RNC based on the maximum delay. Whether the CFN is adjusted or the transmission time is adjusted may be based on whether the maximum transmission delay is greater than or less than a single TTI, for example.

In one or more embodiments of the method 500, if three or more call legs of the call are supported by the second RNC (e.g., the DRNC 70), the indicated call leg is deleted, and the DRNC communication link delay received from the DRNC in block 506 is for whichever of the remaining call legs of the DRNC that has the greatest communication link delay value.

Figure 8:
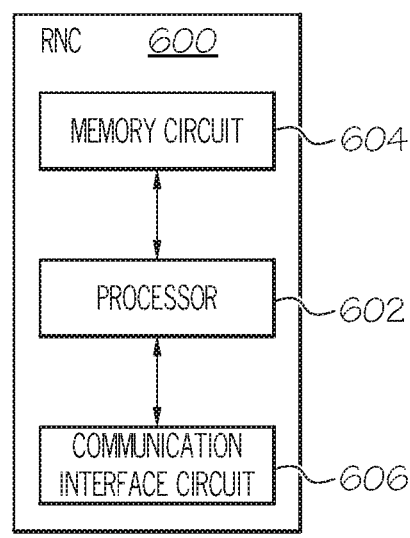
FIG. 8 illustrates an example Radio Network Controller (RNC).

FIG. 8 illustrates an example Radio Network Controller (RNC) 600 configured to carry out one of more of the techniques discussed above (e.g., any combination of the methods 200, 300, 400, 500). The RNC includes one or more processing circuits (shown as "processor" 602), a memory circuit 604, and a communication interface circuit 606.

The processor 602 includes one or more processing circuits, including, for example, one or more microprocessors, microcontrollers, digital signal processors, or the like, and is configured with appropriate software and/or firmware to carry out one or more of the techniques discussed above. The memory circuit 604 is configured to store communication link delays (e.g., Iub interface delays and Iur interface delays). The memory circuit 604 may also store program instructions and other additional data needed by the processor 602 to perform its functions. The memory circuit 604 may, for example, include a non-volatile memory device such an electrically erasable programmable read only memory (EEPROM), flash memory, or magnetoresistive random access memory (MRAM). Of course, a volatile memory device, such a random access memory (RAM), may also be used to store the communication link delays. The communication interface circuit 606 includes circuitry configured to communicate with other RNCs and with base stations supported by the RNC 600.

In one embodiment, the RNC 600 is a "first RNC" (e.g., a DRNC), and the one or more processing circuits of processor 602 are configured to determine a communication link delay of a base station supported by the first RNC, and store the determined communication link delay in the memory circuit 604. The one or more processing circuits are further configured to, subsequent to the determination of the communication link delay, receive a request from a different, second RNC (e.g., a SRNC) to add a call leg that includes the base station for a call supported by the second RNC; and based on the request, transmit a response to the second RNC that indicates the determined communication link delay.

In the same or another embodiment, the RNC 600 is a "first RNC" (e.g., a SRNC) and the one or more processing circuits of processor 602 are configured to transmit a request from the first RNC to a different, second RNC (e.g., a DRNC) to add a call leg that includes a base station supported by the second RNC for a call of a wireless terminal supported by the first RNC. The one or more processing circuits are further configured to receive a response from the second RNC that indicates a predetermined communication link delay for the base station, and perform transport channel synchronization for the wireless terminal based on a set of communication link delays that includes the predetermined communication link delay. The predetermined communication link delay is predetermined prior to the transmission of the request.

As discussed above, performance of transport channel synchronization can include determining a maximum of the communication link delays in the set; and performing one or both of: adjusting a CFN of the first RNC (e.g., the SRNC) based on a maximum Iub interface delay of all Iub interfaces implicated in the call, and/or adjusting a transmission time of a data frame that is transmitted from the first RNC based on the maximum delay.

In one embodiment, the RNC 600 is a "first RNC" (e.g., a DRNC), and the one or more processing circuits of processor 602 are configured to determine a communication link delay for each of a first base station and a second base station supported by the first RNC, and store the determined communication link delay in the memory circuit 604. These communication link delays could include delays D5 and D70 in the fourth scenario above, for example. The first base station (e.g., base station 72B) is included in a first call leg of a call supported by a different, second RNC (e.g., SRNC 62), and the second base station (e.g., base station 72A) is included in a second leg of the call. The one or more processing circuits are further configured to, subsequent to the determination of the communication link delays, receive a request from the second RNC to delete the first call leg; and based on the request, transmit a response to the second RNC that indicates the determined communication link delay for the second base station which is still part of the call. This could include, for example, the delay D5 in the fourth scenario above.

In some embodiments, the request and response are transmitted over an Iur interface between the first and second RNCs, and each communication link delay is an Iub interface delay. In some embodiments, the request is a RNSAP request, and the response is a RNSAP response.

In one or more embodiments, if three or more call legs of the call are supported by the first RNC (e.g., the DRNC 70), the indicated call leg is deleted, the DRNC determines which of its remaining call legs has the greatest communication link delay, and the DRNC returns that greatest communication link delay value to the second RNC.

In the same or another embodiment, the RNC 600 is a "first RNC" (e.g., a SRNC) and the one or more processing circuits of processor 602 are configured to establish a call for a wireless terminal supported by the first RNC (e.g., wireless terminal 74). The call includes first and second call legs supported by a different, second RNC (e.g., DRNC 70). The first call leg includes a first base station supported by the second RNC (e.g., base station 72B), and the second call leg includes a second base station supported by the second RNC (e.g., base station 72A). The one or more processing circuits are further configured to transmit a request to the second RNC to delete the first call leg, and receive a response from the second RNC that indicates a predetermined communication link delay for the second base station. This could include the delay D5 in the fourth scenario above, for example. The one or more processing circuits are further configured to perform transport channel synchronization for the wireless terminal based on a set of communication link delays that includes the predetermined communication link delay for the second base station. The predetermined communication link delay is predetermined prior to the transmission of the request.

In some embodiments, the request and response are transmitted over an Iur interface between the first and second RNCs, and each communication link delay is an Iub interface delay. In some embodiments, the request is a RNSAP request, and the response is a RNSAP response.

As in the examples discussed above, the performance of transport channel synchronization could include determining a maximum of the communication link delays in the set; and performing one or both of: adjusting a CFN of the first RNC based on the maximum delay, and adjusting a transmission time of a data frame that is transmitted from the first RNC based on the maximum delay.

In one or more embodiments, if three or more call legs of the call are supported by the second RNC (e.g., the DRNC 70), the indicated call leg is deleted, and the DRNC communication link delay received from the DRNC is for whichever of the remaining call legs of the DRNC that has the greatest communication link delay value.

The same RNC 600 may be configured to perform any combination of the methods 300, 400, 500, 600. In this regard, the RNC 600 may be a DRNC with respect to some wireless terminals, but a SRNC with respect to other wireless terminals. Thus, the same RNC 600 can simultaneously act as a SRNC and a DRNC with respect to different terminals. As such, the RNC 600 can be configured to implement a combination of the methods 200, 300, 400, 500. Alternatively, the RNC 600 could be configured to implement one of the methods 200, 300 400, 500.

The techniques discussed herein can provide a number of advantages compared to prior art synchronization techniques. In particular, the techniques discussed herein can reduce the delays caused by RTT calculations stemming from addition or deletion of a call leg. This, in turn, shortens the time required for performing transport channel synchronization when adding or deleting a radio link belonging to a DRNC. These techniques minimize the transmission delay and the buffering time when adding or deleting a radio link RL belonging to a DRNC. As a result of the decreased RTT, improved Transmission Control Protocol (TCP) throughput and voice quality can be achieved.

In heterogeneous networks, also known as "HetNets," a combination of macro cells and non-macro cells are used. As discussed above, this may mean that a large variation between transport network delays is present. The techniques discussed herein provide for a smooth interaction between macro and HetNet networks that may exhibit varying transport characteristics, with seamless operation transitions between them, while maintaining service continuity and minimizing RTT time. Of course, it is understood that HetNets are not required, and that the techniques discussed herein may be useful in macro cells even if no non-macro cells are used. Application WO 2014/070053 discussed a method of determining communication link delays in the background, before they were actually needed for performing transport channel synchronization, and then using the determined communication link delays when they were needed at new radio link establishment. However, the '053 application only disclosed performing this within by a single RNC within its own RNS. There were no teachings related to applying these techniques such that the predetermined delays were shared across more than one RNC or more than one RNS. Extending the teachings of the '053 patent to other RNCs/RNSs could have meant that a single RNC would query not only its own base stations but also those of the other RNSs when performing RTT calculations to determine a very large set of communication link delays, which could be impractical because the number of base stations involved would increase enormously when the RNC is connected to other RNCs over Iur links. Moreover, such inquiries would impose a large processing demand and would consume considerable capacity on the Iub/Iur links, especially when a given RNC can be connected to a large number of base stations (a number which increases with the deployment of non-macro base stations). The techniques discussed herein avoid those issues by having each RNC predetermine values for its own respective base stations (not those of other RNCs), and then when the delay for a base station supported by another RNC is needed, obtaining that predetermined value from the other RNC (e.g., using RNSAP signaling).

The present disclosure may, of course, be carried out in other ways than those specifically set forth herein without departing from essential characteristics of the present disclosure. The present embodiments are to be considered in all respects as illustrative and not restrictive, and all changes coming within the meaning and equivalency range of the appended claims are intended to be embraced therein.

What is claimed is:

1. A method implemented by a first Radio Network Controller (RNC), the method comprising:
   determining a communication link delay for each of a plurality of base stations supported by the first RNC;
   subsequent to the determining, receiving a request from a different, second RNC to delete a call leg that includes a base station of the plurality of base stations for a call supported by the second RNC when two or more call legs, which include their respective base stations of the plurality of base stations, for the call are supported by the second RNC; and
   based on the request, transmitting a response to the second RNC, wherein the response indicates the determined communication link delay for each of the plurality of base stations supported by the first RNC.

2. The method of claim 1, wherein the request and the response are transmitted over an Iur interface between the first and second RNCs, and wherein the communication link delay is an Iub interface delay.

3. The method of claim 1, wherein the request is a Radio Network Subsystem Application Part (RNSAP) request, and the response is an RNSAP response.

4. The method of claim 1, wherein one or more of the plurality of base stations are non-macro base stations that support respective small cells.

5. The method of claim 1, wherein the first RNC acts as a drift RNC (DRNC) with respect to a soft handover from the second RNC.

6. A method implemented by a first Radio Network Controller (RNC), the method comprising:
   transmitting a request from the first RNC to a different, second RNC to add a call leg that includes a base station supported by the second RNC for a call of a wireless terminal supported by the first RNC;
   receiving, in response to the transmitted request, a response from the second RNC, wherein the response indicates a predetermined communication link delay for the base station supported by the second RNC;
   adding a predefined Iur interface delay of an Iur interface between the first and second RNCs to the predetermined communication link delay for the base station supported by the second RNC to determine a modified communication link delay for the base station supported by the second RNC; and
   performing transport channel synchronization for the wireless terminal based on a set of communication link delays that includes the modified communication link delay,
   wherein the predetermined communication link delay is predetermined prior to the transmitting.

7. The method of claim 6, further comprising:
   determining one or more additional communication link delays, each corresponding to a communication link of a respective base station supported by the first RNC that is part of a call leg of the call,
   wherein the determining is performed prior to the transmitting, and
   wherein the one or more additional communication link delays are included in the set of the communication link delays.

8. The method of claim 6, wherein the performing transport channel synchronization comprises:
   determining a maximum communication link delay of the communication link delays included in the set;
   and performing one or both of:
      adjusting a connection frame number (CFN) of the first RNC based on the maximum communication link delay; and
      adjusting a transmission time of a data frame that is transmitted from the first RNC based on the maximum communication link delay.

9. The method of claim 6,
   wherein the request and the response are transmitted over the Iur interface between the first and second RNCs, and
   wherein each communication link delay is an Iub interface delay.

10. The method of claim 8,
    wherein the determining the maximum communication link delay of the communication link delays is performed based on the modified communication link delay.

11. The method of claim 6, wherein the request is a Radio Network Subsystem Application Part (RNSAP) request, and the response is an RNSAP response.

12. A first Radio Network Controller (RNC), comprising:
    one or more processing circuits; and
    memory containing instructions executable by the one or more processing circuits whereby the first RNC is operative to:
       determine a communication link delay for each of a plurality of base stations supported by the first RNC;
       store the determined communication link delay in the memory;
       subsequent to the determination of the communication link delay, receive a request from a different, second RNC to delete a call leg that includes a base station of the plurality of base stations for a call supported by the second RNC when two or more call legs, which include their respective base stations of the plurality of base stations, for the call are supported by the second RNC; and
       based on the request, transmit a response to the second RNC, wherein the response indicates the determined communication link delay for each of the plurality of base stations supported by the first RNC.

13. The first RNC of claim 12, wherein the instructions are such that the first RNC is operative to transmit the request and the response over an Iur interface between the first and second RNCs, and wherein the communication link delay is an Iub interface delay.

14. The first RNC of claim 12, wherein the request is a Radio Network Subsystem Application Part (RNSAP) request, and the response is an RNSAP response.

15. The first RNC of claim 12, wherein one or more of the plurality of base stations are non-macro base stations that support respective small cells.

16. The first RNC of claim 12, wherein the first RNC acts as a drift RNC (DRNC) with respect to a soft handover from the second RNC.

17. A first Radio Network Controller (RNC), comprising:
    one or more processing circuits; and memory configured to store communication link delays and containing instructions executable by the one or more processing circuits whereby the first RNC is operative to:
- transmit a request from the first RNC to a different, second RNC to add a call leg that includes a base station supported by the second RNC for a call of a wireless terminal supported by the first RNC;
- receive, in response to the transmitted request, a response from the second RNC, wherein the response indicates a predetermined communication link delay for the base station supported by the second RNC;
- add a predefined Iur interface delay of an Iur interface between the first and second RNCs to the predetermined communication link delay for the base station supported by the second RNC to determine a modified communication link delay for the base station supported by the second RNC; and
- perform transport channel synchronization for the wireless terminal based on a set of the communication link delays that includes the modified communication link delay,
- wherein the predetermined communication link delay is predetermined prior to the transmission of the request.

18. The first RNC of claim 17, wherein the instructions are such that the first RNC is further operative to:
- determine one or more additional communication link delays, each corresponding to a communication link of a respective base station supported by the first RNC that is part of a call leg of the call,
- wherein the determination of the one or more additional communication link delays is performed prior to the transmission of the request, and
- wherein the one or more additional communication link delays are included in the set of the communication link delays.

19. The first RNC of claim 17, wherein the instructions are such that, to perform the transport channel synchronization, the first RNC is operative to:
- determine a maximum communication link delay of the communication link delays included in the set; and
- perform one or both of:
  - adjust a connection frame number (CFN) of the first RNC based on the maximum communication link delay; and
  - adjust a transmission time of a data frame that is transmitted from the first RNC based on the maximum communication link delay.

20. The first RNC of claim 17, wherein the instructions are such that the first RNC is operative to transmit the request and the response over the Iur interface between the first and second RNCs, and
- wherein each communication link delay is an Iub interface delay.

21. The first RNC of claim 19, wherein the determination of the maximum communication link delay of the communication link delays is performed based on the modified communication link delay.

22. The first RNC of claim 17, wherein the request is a Radio Network Subsystem Application Part (RNSAP) request, and the response is an RNSAP response.

* * * * *